United States Patent [19]
Siebert

[11] Patent Number: 5,317,582
[45] Date of Patent: May 31, 1994

[54] SYSTEM FOR DETECTING MODULATED LASER SIGNALS

[75] Inventor: Edward T. Siebert, New Fairfield, Conn.

[73] Assignee: Hughes Aircraft Company, Los Angeles, Calif.

[21] Appl. No.: 46,062

[22] Filed: Apr. 12, 1993

[51] Int. Cl.[5] .................................. H01S 3/00
[52] U.S. Cl. ............................ 372/38; 372/32; 372/29; 372/25
[58] Field of Search .................. 372/38, 32, 29, 25

[56] References Cited

U.S. PATENT DOCUMENTS

| 4,709,369 | 11/1987 | Howard | 372/38 |
| 5,084,887 | 1/1992 | Ohashi | 372/38 |
| 5,208,819 | 5/1993 | Huber | 372/32 |
| 5,212,700 | 5/1993 | Okita | 372/38 |

FOREIGN PATENT DOCUMENTS 0007987  1/1982  Japan ........................ 372/38

Primary Examiner—Georgia Y. Epps
Attorney, Agent, or Firm—Michael W. Sales; Wanda K. Denson-Low

[57] ABSTRACT

A system (10, 80) for detecting modulating laser signals having a memory (28) for storing the occurrences of a plurality of different pulse intervals in accordance with at least one preselected characteristic of the different pulse intervals and outputting a signal when a weighted sum of the number of different pulse intervals counted exceeds a preselected threshold number.

22 Claims, 4 Drawing Sheets

SYSTEM FOR DETECTING MODULATED LASER SIGNALS

BACKGROUND OF THE INVENTION

The present invention generally relates to a system for detecting modulated laser signals and, in particular, relates to one such system having means for storing the occurrences of a plurality of different pulse intervals in accordance with at least one preselected characteristic of the different pulse intervals and outputting a signal when a weighted sum of the number of different pulse intervals counted exceeds a preselected threshold number.

Many modem weapon systems employ modulated laser signals to locate and/or aim a weapon at a target. As used herein the term "modulated" includes laser signals that are generated either by pulsing a laser on and off of by chopping the output of a continuous wave laser. Ordinarily, the modulated laser signal generated by pulsing the laser on and off will result in a signal having relatively short high intensity pulses spaced apart by long intervals. The modulated laser signal generated by chopping a continuous wave laser usually has relatively longer pulses than that of the pulsed laser.

It is therefore quite important to be able to detect the presence of modulated laser signals reliably and rapidly.

Presently, modulated laser signals are detected by systems that have a single channel. The system counts the temporal interval between successive detected pulses and stores, or bins, the information according to the interval between each pulse. When the number of occurrences of any given pulse interval reaches a preselected threshold the system indicates the presence of a modulated laser signal.

Such a system has a number of drawbacks, the first of which is the fact that only the occurrence of one specific pulse interval, i.e., information from only one bin, is used to determine the presence of a modulated signal while information from other bins is not used to make a determination. This approach resulting in an unnecessarily low system sensitivity. For example, if a signal is detected, i.e., the signal has sufficient intensity above the background noise, the interval counter begins counting the interval. The next signal detected stops the counter for the first interval and starts a new interval count, the first interval being stored in a bin for that specific time interval and the occurrence count for that bin is incremented by one. When many pulses have occurred, in fact, there may have been regular pulse intervals undetected due to background noise or the like during the first counted interval. Present systems are unable to correct for or make use of this information.

Further, modem systems cannot account for common slightly changing pulse intervals originating from the same source. Modern modulated laser signal detection systems store such signals in different pulse interval bins. As a result, the signal presence threshold would take an excessive time to be reached.

Still further, since such conventional systems are single channel systems, all of the background noise reaching the system input is placed into the same bin as the signal.

In addition, present systems operate using only a single threshold regardless of the signal strength received. Hence, since the sensitivity of the system must be set to detect the lowest possible source intensity, indication of a relatively high intensity source may be delayed.

Further still, present systems, being single channel systems can not make use of known threat characteristics nor can they distinguish between pulsed and chopped continuous wave laser signals. Finally, present systems generally use a relatively large field of view. This results in a high noise input if the sun is anywhere in the field of view.

Consequently, it is readily recognized that a system for detecting modulated laser signals that overcomes these drawbacks is highly desirable.

SUMMARY OF THE INVENTION

Accordingly, it is one object of the present invention to provide a system for detecting modulated laser signals that overcomes the above-recited drawbacks of the conventional systems.

This object is accomplished, at least in part, by a system having means for storing each occurrence of a plurality of different pulse intervals and outputting a signal when weighted sum of the number of different pulse intervals counted exceeds a preselected threshold number.

Other objects and advantages will become apparent to those skilled in the art from the following detailed description read in conjunction with the appended claims and the drawing attached hereto.

BRIEF DESCRIPTION OF THE DRAWINGS

The drawings, not drawn to scale, includes.

DETAILED DESCRIPTION OF THE PREFERRED EMBODIMENT

Figure 1:
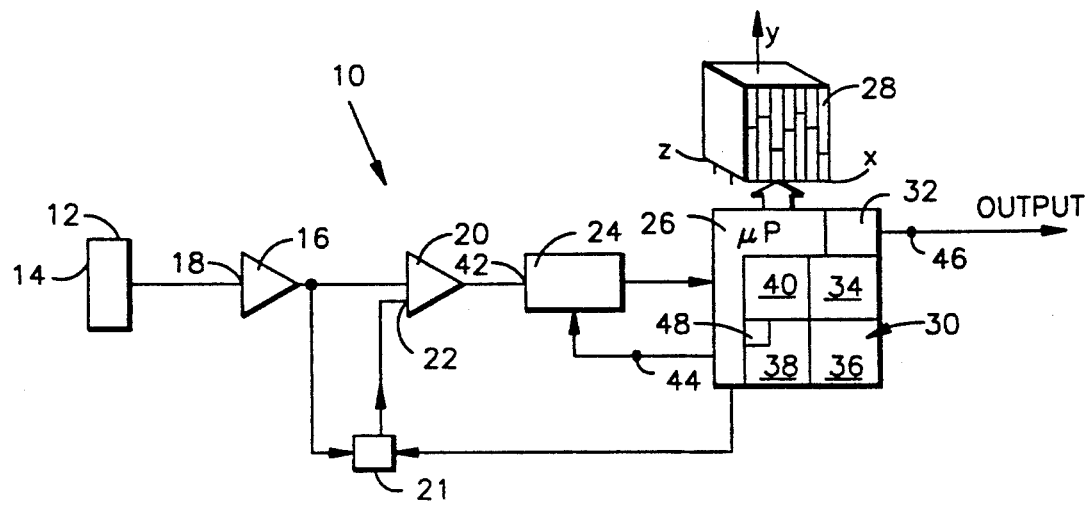
FIG. 1 which is a block diagram of a system for detecting modulated laser signals embody principles of the present invention.

A system for detecting modulated laser signals, generally indicated at 10 in FIG. 1 and embodying the principles of the present invention includes means 12 for detecting a laser signal that outputs an electrical signal in response to light impinging upon the detector surface 14 thereof, means 16, having the electrical signal from the means 12 as an input 18, for amplifying the signal from means 12 and for outputting an amplified signal to the means 20 for indicating the possible presence of a modulated laser signal by determining whether the electrical signal exceeds a threshold 22 and for outputting a signal when the threshold 22 is exceeded, means 24, having the outputted signal form the means 20 as an input thereto, for counting time intervals between indications, means 26 for receiving and processing the output from the means 24, means 28, communicating with the means 26, for storing the occurrences of pulse intervals according to the length of the interval, means 30 for generating a weighted sum of the number of different pulse intervals counted, and means 32 for outputting a signal when the weighted sum of the number of different pulse intervals exceeds a preselected threshold number.

As used herein, the phrase "weighted sum", as well as all idiomatic variations thereof, means to take a plurality of numbers, apply an appropriate factor to each, and sum the resulting numbers. It will be understood that in the system 10 the appropriate factor is typically chosen for optimizing the signal to noise ratio.

In addition, the system 10 can also include means 34 for compensating for jitter in the source of laser pulses, means 36 for sampling multiple bins, means 38 for separately recognizing one or more known modulated laser signal sources, and means 40 for counting the occurrences of different pulse intervals in accordance with a further preselected characteristic of the laser pulse.

In one embodiment, the means 12 for detecting laser signals can be a conventional light detector filtered for the spectral region of interest. The means 16 for indicating the possible presence of a laser signal can be a conventional comparitor which takes the output signal from the amplifying means 16 as an input signal 20 and compares it to a threshold 22, the threshold 22 is typically noise riding, that is, it is proportional to the RMS noise present on the input signal, the proportionality is selected to keep the noise induced indication at a desired rate and can be controlled by the means 26. The desired rate of noise indications is determined by the threshold count and the allowable false alarm rate. The same result can also be obtained by adjusting the gain of the means 16 for amplifying the signal from the detector 12 instead of the threshold.

In this embodiment, the means 24 for counting time intervals can be any conventional resettable clock counter that begins counting when an electrical signal indicative of a detected occurrence is presented at the input 42 thereof. At the occurrence of the next detected occurrence, the interval length is received from the means 24 by the signal processing means 26. Previous intervals stored in the memory 28 by the signal processing means 26 can be summed to the latest internal to generate intervals from the last occurrence to all prior occurrences that are within the range of interest. The means 26 stores the occurrences in the appropriate pulse interval bins in the memory 28 by incrementing the counts in those bins and resets the means 24 via line 44 to count the next interval.

The means 26, in the preferred embodiment, is a conventional microprocessor. The means 28 for storing the occurrences of different pulse intervals is, preferably, a random access memory. As shown in FIG. 1, the random access memory 28 can be visualized as a cube of discrete bins wherein different time interval bins are spaced along the x axis with the counting of occurrences of each different time interval being indicated along the y axis. As more fully discussed below, the bins can be made three dimensional by use of one or more preselected signal characteristics, such as, signal intensity, along the z axis. It will be understood that by use of only the x and y axes, the random access memory 28 can act as a histogram. It will be understood that, although the microprocessor 26 is depicted in the Figures as having discrete portions, such a depiction is for clarity and discussion purposes only. In practice, the various discrete portions would be stored software programs accessed by the software of the microprocessor to perform preselected functions.

The means 30 for generation of a weighted sum of the number of different pulse intervals can be one or more dedicated software routines within the microprocessor or alternatively can be implemented in hardware. The means 32 for outputting a signal when the weighted sum of the number of different pulse intervals exceeds a preselected number can be any conventional thresholding mechanism. In hardware this could be implemented by a conventional comparitor or in software by a subroutine that looks at a count sum presented to it and compares the count in that with a preselected number. Upon the count exceeding the preselected number a signal would be outputted on line 46.

Figure 2A:
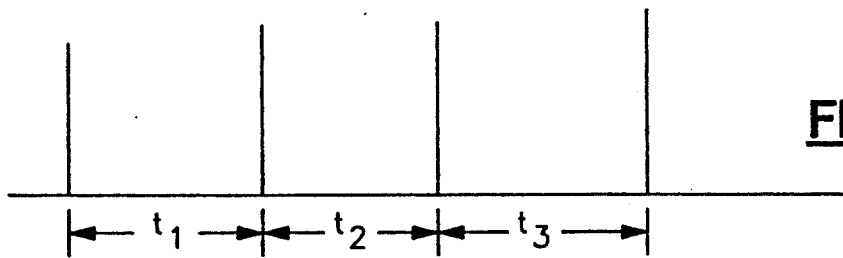
FIGS. 2A–2C are pictorial graphs showing a weighing factor particularly useful with the present invention.
Figure 2B:
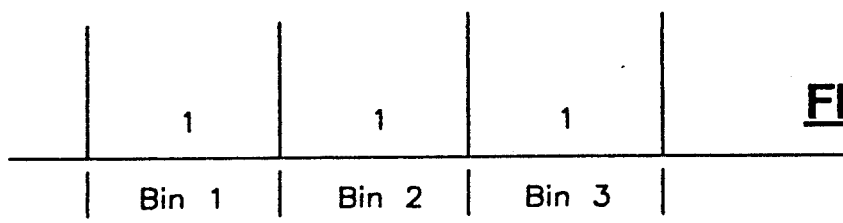
Figure 2C:
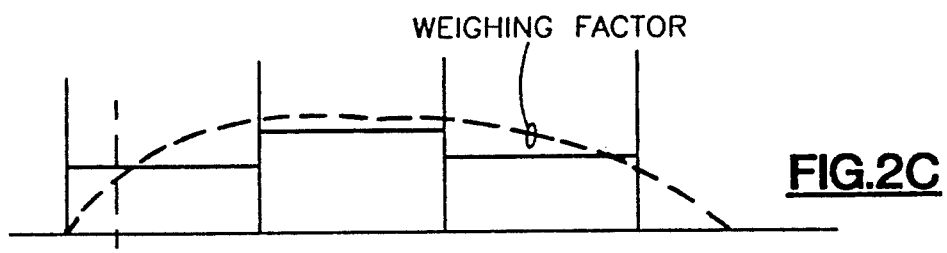

In the preferred embodiment, the means 34 for compensating for jitter in the source of laser pulses includes a weighing sum of the occurrences stored in bins of pulse intervals close in time. As shown in FIG. 2A, a laser pulse source experiencing jitter, either by an intentional pulse interval modulation or because of source characteristics inherent in the source, will transmit pulses of energy at varying pulse intervals, e.g., $t_1$, $t_2$, $t_3$. These occurrences, because each represents a different pulse interval are stored in different bins, as shown in FIG. 2B. However, when the bins, because of the proximity to each other in time intervals, are summed, as shown in FIG. 2C, a larger occurrence count is reached. Hence, the threshold needed to trigger the means 32 for outputting a signal indicative of the presence of a modulated laser signal is reached earlier in time. As a result, the possibility of avoiding or countering such a source is increased.

In practice, the particular bins summed are selected and weighed by the anticipated jitter or modulation spectrum, or a signal trial spectrum can be used for unknown jitter in modulation. The means 34 for compensating for jitter in the source of laser pulses can be efficiently implemented using known software programming techniques by the addition of hardware.

Figure 3A:
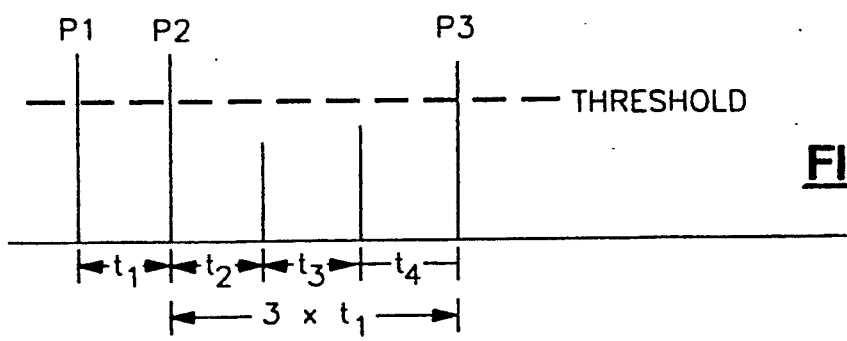
FIGS. 3A–3C are pictorial graphs showing another weighing factor particularly useful with the present invention.
Figure 3B:
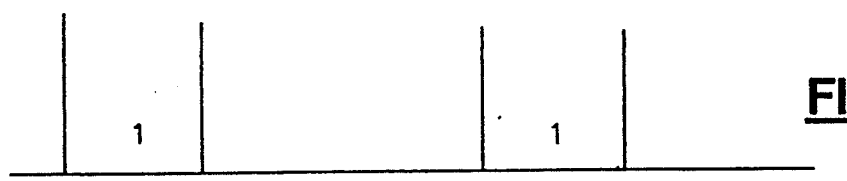
Figure 3C:
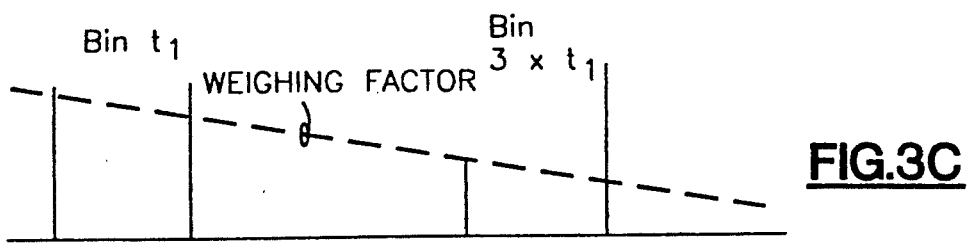

In the preferred embodiment, the means 36 for counting multiple bins includes a weighted sum of the occurrences stored in bins of intervals that are integer multiples of each other. As shown in FIG. 3A pulses P1, P2, and P3 defining pulse intervals $t_1$ and 3 times $t_1$ are detected as signals above the system threshold 22. Also, as shown, numerous intervening pulses may occur without being detected by the system 10. The failure to detect such intervening pulses may be caused by atmospheric scintillation of the laser pulses noise in the laser detector 12 or for other reasons. Nonetheless, as shown in FIG. 3B, the pulses will ordinarily result in occurrences being counted in two or more different bins. However, when the bins, because the time intervals represented thereby are integral multiples of each other, are summed, as shown in FIG. 3C, a larger occurrence count is reached. Hence, the threshold needed to trigger the means 32 for outputting a signal indicative of the presence of a modulated laser signal is reached earlier in time. The weighing is usually a linear ramp. For the 5 pulses shown in FIG. 3A, the pulse interval t1 can occur 4 times, the interval 2 times t1 can occur 3 times, the interval 3 times t1 can occur 2 times, and the interval 4 times t1, occurs only once. As many pulses are accumulated these are the expected weighing factors used in the sum. It is appreciated that for a pulse burst having N pulses, the weighing ramp covers N intervals and weights them according to N, N−1, N−2, ... 1. For a laser with a constant repetition frequency, N will increase with time. If pulse bursts of N pulses are used, N is constant after the first burst and the count increases with repetition. This weighted sum can also be implemented if the pulse interval of threats are known. In such circumstances, all bins representative of time intervals that are integer multiples of the known pulse interval can be summed without having to receive an initial pulse interval to measure. As with the means 34, the means 36 for sampling multiple bins is efficiently implemented using conventional software programming techniques or hardware addition.

Figure 4:
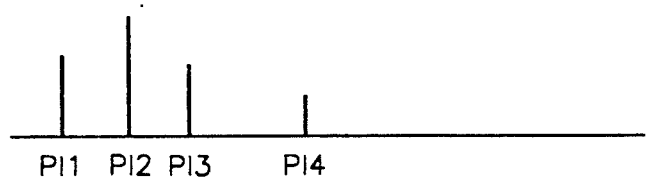
FIG. 4 is a pictorial graph of a typical known modulated laser signal.

The means 38 for separately recognizing known modulated laser signal sources includes a weighted sum of the occurrences in a number of preselected bins. In the preferred embodiment, the means 38 for separately recognizing known sources includes a non-volatile memory 48 having known threat pulse interval characteristics stored therein. A typical modulated laser signal source pulse interval provide that may be stored in the memory 48 is shown in FIG. 4. As shown, both the distribution of the pulse intervals (PI) and the occurrence profile of the pulse intervals are stored. The means 38 counts the occurrences in the bins matching the known profile and upon reaching the matching weighted sum, indicates to the means 32 that the threshold has been reached.

Figure 5:
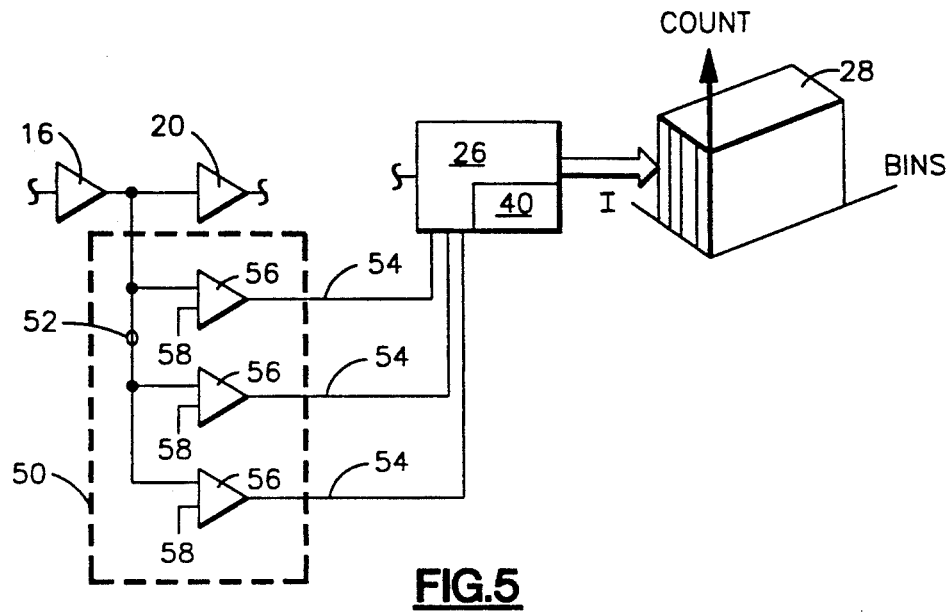
FIG. 5 is a schematic of a circuit particularly applicable in conjunction with the system shown in FIG. 1.

In one embodiment, the means 40 for counting the occurrences of different pulse intervals in accordance with a further preselected characteristic of the laser pulse includes a means 50 for determining the relative intensity of a pulse. Preferably, as shown in FIG. 5, the means 50 has, as an input 52 thereto, the same signal presented to the means 20 and a plurality of outputs 54 connected to the microprocessor 26. In this embodiment, the means 50 includes a plurality of comparitors 56, connected in parallel, each having a different threshold 58. Although only three comparitors 56 are shown in FIG. 5, it will be understood that any number of such comparitors 56 can be used.

Figure 6:
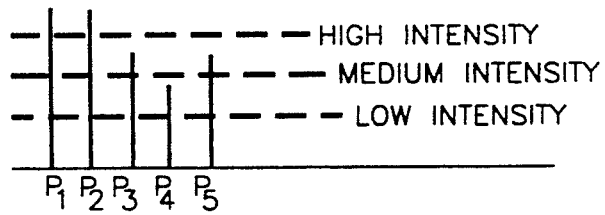
FIG. 6 is a pictorial graph of another weighing factor particularly useful with the present invention.

As shown in FIG. 6, the detected pulses P1, P2, P3, P4, and P5 can, by use of the means 50 have signal intensity information associated therewith which can be stored in the memory 28 and used by the means 40 for sorting. Clearly, the occurrence count needed to trigger the means 32 can be much lower for high intensity pulses than for relatively lower intensity pulses. Hence, a source that is either physically closer or higher powered such that it has a high intensity tag associated with it in the memory 28 can be detected more quickly than other signals.

Figure 7A:
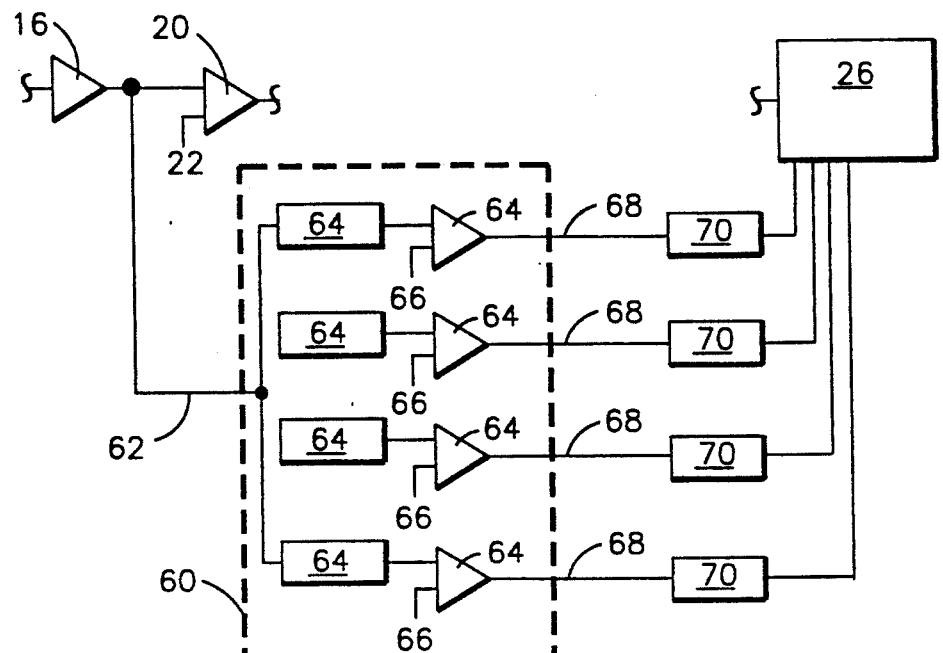
FIG. 7A–7C are schematics of circuits particularly useful in conjunction with the system shown in FIG. 1.

In another embodiment, as shown in FIG. 7A, the system 10 includes a means 60 for identifying a plurality of different known sources. As shown, the means 60 has an input 62 from the amplifier 16, a plurality of matched filters 64, the output of which are connected to an equal plurality of comparitors 66 each having a separate threshold 68 and an output to an occurrence counter 70 and outputs that count to the microprocessor 26. In operation each of the matched filters 64 filters unwanted noise and via comparitors 66 and counters 70 accumulates pulse interval counts for various known modulated laser signal sources. The microprocessor 26 then receives the information from the means 60 and outputs a signal indicative of known signal sources. It will be understood that the means 60 can be included within the system 10 without detracting from the performance features thereof. In fact, it is preferred that the means 60 be provided in such an arrangement to enable additional matched filters 64 to be added as other modulated laser signal source signatures become known.

Figure 7B:
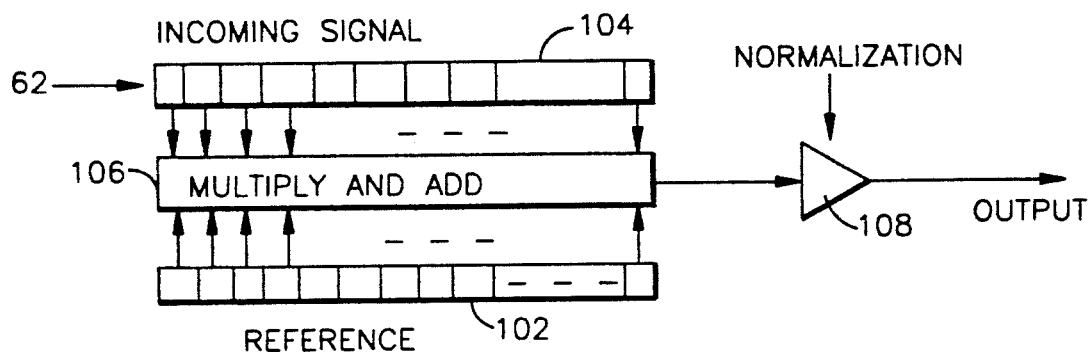

It can be appreciated that matched filters can assume a variety of forms because of the variety of signals and the variety of implementation. Matched filters can be implemented equally well in the frequency domain or the time domain. For example, a time domain matched filter can be a common correlator as shown in FIG. 7B. A representation of the signal to be detected is stored in a reference register 102 and correlated by means 104 with the incoming signal 62 being clocked through the corresponding shift register 106. The correlation means 112 multiplies the signal be the reference on a per bin basis and sums the result. When the sum is normalized by the signal by means 108, the output is maximum when the signal is equal to the reference and small otherwise. Thus, the output is indicative of the presence of the desired, or sought, signal. If the signal contains P pulses, the output signal-to-noise will be improved by the square root of P, thereby improving sensitivity. The signal is clocked in at a rate corresponding to the desired pulse interval resolution which is ideally chosen to be the signal pulse width or pulse jitter width. The total signal duration divided by the pulse width gives the total number of bins in the register. For periodic signals, this number is MP where M is the number of bins per cycle, ideally the pulse repetition interval (PRI) divided by the pulse width. Because digital multiplication is simpler than analog multiplication, the reference can represent the signal by a series of ones and zeros, allowing the correlation means to be a simple sum of those bins where the reference is one.

Figure 7C:
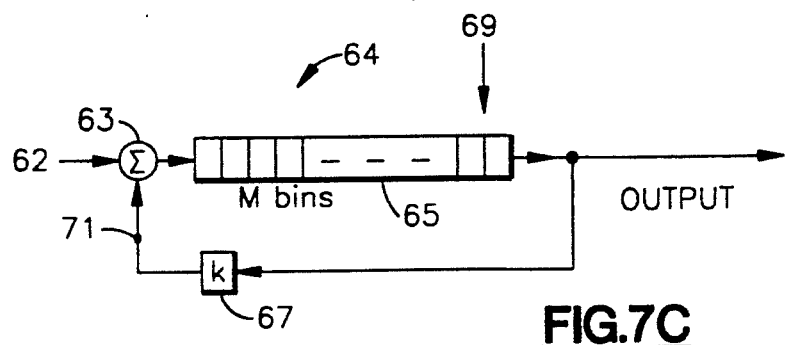

It will be appreciated that for sparse data, M can be large. The number of pulses can also be large, thereby making the length of the registers MP very large. For periodic signals this complexity can be avoided by the recirculating shift register shown in FIG. 7C. The incoming signal 62 is summed by means 63 with a second signal 71 from multiplier 67 that is proportional to k times the shift register output, and input into shift register 65 which typically can be a charge coupled device M bins long. A clock 69 increments the shift register at a time interval equal to PRI/M so that successive pulses occur in synchronism with the time it takes the prior pulses to circulate through the shift register. Successive pulses are all summed in the same bin thereby increasing the signal-to-noise ratio by the square root of P. The multiplication factor k 67 is typically equal to EXP $(-1/P)$ which allows the register to all P pulses before the memory is lost. As before, the output is indicative of signal presence. It can readily be appreciated that for periodic signals this approach provides the same sensitivity improvement as the correlator but with a much shorter shift register and less hardware. It can also be appreciated that it is, also possible to feedback to the input other register bins besides the last bin and sum those inputs multiplied by an appropriate k.

Figure 8:
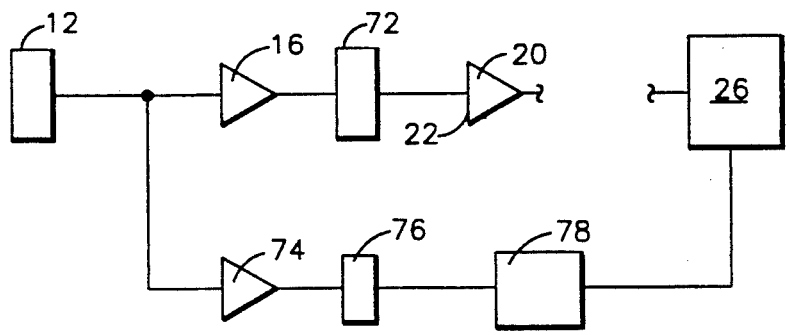
FIG. 8 is a block diagram of a system embodying the principles of the present invention.

As shown in the configuration set forth in FIG. 8, a high frequency band pass filter 72 is inserted between the amplifier 16 and the comparitor 20 of the system 10 shown in FIG. 1. In addition, in this embodiment, the signal from the detector 12 is provided to a second amplifying means 74 and the output thereof provided as an input to a low frequency band pass filter 76. The signal passing through the low frequency band pass filter 76 is then processed by a transform processor 78. The output of the transform processor 78 is provided to the microprocessor 26.

As well known, the operating frequency of pulsed lasers is usually orders of magnitude larger than that of chopped continuous wave lasers. Hence, in operation, the high an low frequency band pass filters, 72 and 76, respectively, serve to separate pulsed laser signals from chopped continuous wave signals. More specifically, the pulsed laser signals are passed through the comparitor 20 and processed as previously described herein. However, the low frequency, or chopped continuous wave, signals are passed through the transform processor 78 wherein the signals are transformed into frequency/amplitude space and the pulse intervals are counted as discussed previously. The transform processor 78 may utilize one or more transform functions, such as a fast Fourier Transform, a Walsh Transform, or other known transforms.

Figure 9:
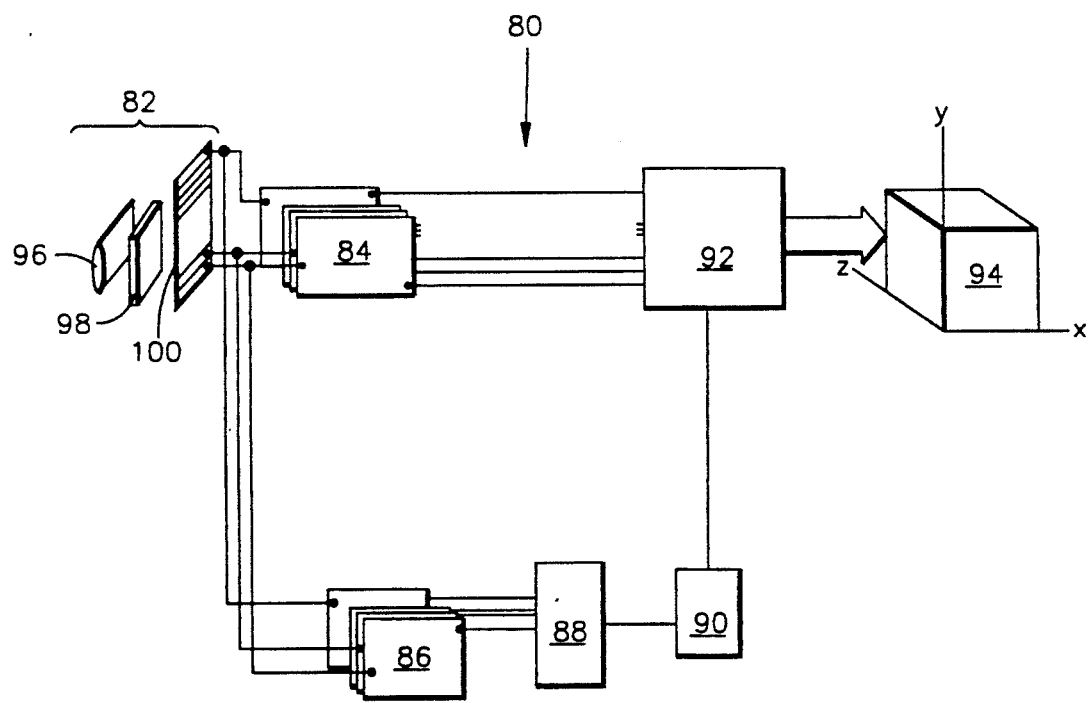
FIG. 9 is a block diagram of a multi-channel system for detecting modulated laser signals embodying the principle of the present invention.

A multi-channel system, generally indicated at 80 in FIG. 9 and embodying the principles of the present invention, includes a multi-channel laser detector 82, means 84 associated with each channel, for detecting multi-channel high frequency pulse intervals, means 86, associated with each channel, for detecting low frequency pulse intervals, means 88 for multiplexing a plurality of low frequency signals, means 90 for transform processing the multiplexed low frequency signal, means 92 for processing pulse interval information from both the transform processing means 90 and the means 84 for detecting high frequency pulse intervals and means 94 for storing pulse interval information.

In the system 80 the multi-channel detector 82 includes a lens 96, for example, a cylindrical lens, that disperses incoming light in accordance with the direction of incidence of the light. As an inherent benefit, the background noise is also dispersed in accordance with the direction of incidence thereof thus increasing the signal to noise ratio of the system. The detector 82, preferably, also includes an optical filter 98 disposed either in front of the lens 96 or immediately thereafter. Preferably, the optical filter 98 includes an electromagnetic grid that also reduces the noise entering the system 80.

The dispersed light from the lens 96 is directed onto an array of light detector elements 100 that, in this embodiment, are arranged so that each row thereof constitutes a signal channel of the system 80. Such an arrangement provides the system 80 with direction of arrival information that can be used by the signal processor 92 to identify tile location of identified threats. That is, each channel represents signals from a particular segment of the overall field-of-view of the system 80 and hence, is indicative of the direction of arrival of that signal.

Preferably, each of the means 84 for processing high frequency signals includes the various elements discussed hereinabove with respect to the single channel system 10. Similarly, each of the means 86 includes the circuit elements discussed in the system 10 shown in FIG. 8. The multiplexing means 88 has one input from each of the means 86 and provides a single output to the transform processor 90. The operation of the signal processing means 92 and the memory 94 are as described with respect to the system 10 except that there are signal inputs from each of the channels. Since the function and structure of each of these elements has been described herein with respect to a single channel system further detailed description is believed unnecessary to those skilled in the art.

Although the present invention has been described herein with respect to a number of different embodiments it will be understood by those skilled in the art that other arrangements and configurations can also be made that do not exceed the spirit and scope hereof. Hence, the present invention is deemed limited only by the appended claims and the reasonable interpretation thereof.

What is claimed is:

1. A system for detecting modulated laser signals, said system comprising:
    means for detecting a laser signal;
    means for determining pulse intervals;
    means for counting the occurrences of a plurality of different pulse intervals;
    means for storing said counted occurrences;
    means for processing said stored counted occurrences and determining a weighted sum of said number of different pulse intervals; and
    means for outputting a signal when said weighted sum of said number of different pulse intervals counted for said different pulse intervals exceeds a preselected threshold number such that a modulated laser signal is detected.

2. The system as claimed in claim 1, further comprising: means for storing said counted occurrences in accordance with at least one preselected characteristic of said different pulse intervals.

3. The system as claimed in claim 1 wherein said processing means includes means for compensating for jitter in the source of said modulated laser signals.

4. The system as claimed in claim 3, wherein said processing means includes means for counting occurrences from integral multiples of at least one bin.

5. The system as claimed in claim 4, further comprising: means for determining the relative intensity of received modulated laser signals.

6. The system as claimed in claim 5, further comprising:
    means for storing pulse interval characteristics of at least one known modulated laser signal source; and
    means for counting the occurrences of pulse intervals in one or more bins matching said stored pulse interval characteristics.

7. The system as claimed in claim 6, further comprising:
    means for identifying a plurality of known modulated laser signal sources.

8. The system as claimed in claim 7, further comprising:
    means for separating pulsed laser signals and chopped continuous wave laser signals.

9. The system as claimed in claim 8, wherein said means for detecting a laser signal includes:
    a lens; and
    a multi-channel detector, said detector having an array of light detecting elements being disposed to receive light from said lens.

10. The system as claimed in claim 3, wherein said compensating means includes means for summing counted occurrences from one or more bins adjacent each other.

11. The system as claimed in claim 1, wherein said processing means includes means for counting occurrences from integral multiples of at least one bin.

12. The system as claimed in claim 1, further comprising: means for determining the relative intensity of received modulated laser signals.

13. The system as claimed in claim 12, wherein said determining means includes a plurality of comparitors connected in parallel, each said comparitor having a different threshold for passing signals therethrough such that signals outputted therefrom are indicative of modulated laser signals of differing signal intensity.

14. The system as claimed in claim 1, further comprising:
means for storing pulse interval characteristics of at least one known modulated laser signal source; and
means for counting the occurrences of pulse intervals in one or more bins matching said stored pulse interval characteristics.

15. The system as claimed in claim 1, further comprising: means for identifying a plurality of known modulated laser signal sources.

16. The system as claimed in claim 15 wherein said means for identifying a plurality of known modulation laser signal sources includes a plurality of matched filters, said matched filters being connected in parallel with each other.

17. The system as claimed in claim 1, further comprising:
means for separating pulsed laser signals and chopped continuous wave laser signals.

18. The system as claimed in claim 17, wherein said separating means includes a high frequency band pass filter in series with a first laser signal amplifier and a low frequency band pass in series with a second modulated laser signals amplifier, said first and second laser signal amplifiers having a common input from said laser signal detecting means.

19. The system as claimed in claim 18, further comprising:
a transform processor, said transform processor being serially connected to the output of said low frequency band pass filter such that the output from said low frequency band pass filter is converted to the frequency/amplitude domain.

20. The system as claimed in claim 1 wherein said means for detecting a laser signal includes:
a lens; and
a multi-channel detector, said detector having an array of light detecting elements being disposed to receive light from said lens.

21. The system as claimed in claim 20, wherein each row of said array constitutes a signal channel.

22. The system as claimed in claim 21, wherein each signal channel includes:
means for determining pulse intervals;
means for counting the occurrences of a plurality of different pulse intervals; and
means for storing said counted occurrences.

* * * * *